Patented Aug. 25, 1925.

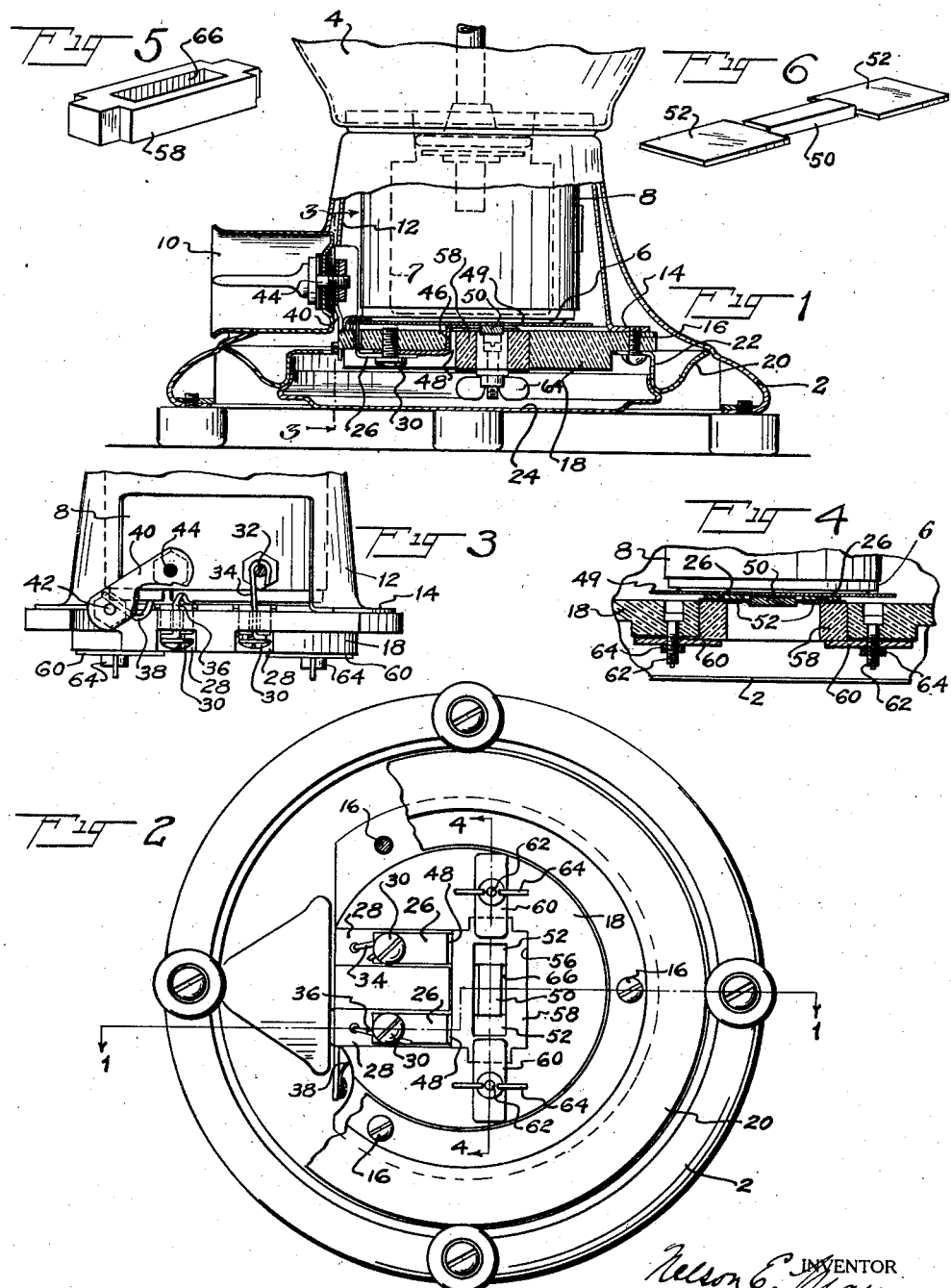

1,551,504

UNITED STATES PATENT OFFICE.

NELSON E. MANN, OF NEWINGTON, CONNECTICUT, ASSIGNOR TO MANNING, BOWMAN & COMPANY, OF MERIDEN, CONNECTICUT, A CORPORATION OF CONNECTICUT.

ELECTRICALLY-HEATED UTENSIL.

Application filed January 16, 1924. Serial No. 686,484.

*To all whom it may concern:*

Be it known that I, NELSON E. MANN, a citizen of the United States, residing at Newington, county of Hartford, State of Connecticut, have invented certain new and useful Improvements in Electrically-Heated Utensils, of which the following is a full, clear, and exact description.

My invention relates to electrically heated utensils, and has special reference to devices for cutting off the current from the utensil when the temperature reaches a predetermined degree.

The object of my invention is to provide an electrically heated utensil with a fusible cut out, the two being combined in such a way that the action is more certain and reliable.

It further has for its object to provide an improved fusible cut out.

The following is a description of my invention, reference being had to the accompanying drawing, in which, Figure 1 is a sectional elevation, taken substantially on the line 1—1 of Fig. 2, of the lower portion of a percolator embodying the features of the invention in their preferred form;

Fig. 2 is a bottom plan view of the percolator with parts broken away and a cover closing a portion of the bottom of the percolator removed;

Fig. 3 is a detail sectional elevation, with parts removed, taken substantially on the line 3—3 of Fig. 1;

Fig. 4 is a detail sectional view taken on the line 4—4 of Fig. 2; and

Figs. 5 and 6 are detail views in perspective of component parts, respectively, of the cut out device of the percolator, the latter part being shown inverted.

The percolator illustrated in the drawing is provided with a base 2, a liquid receptacle 4, a heating chamber 6 connected with the receptacle 4 and having an inner wall shown in dots at 7, a heating unit 8 surrounding the heating chamber, and an electrical plug socket 10, which parts may be of a well known construction. The percolator is further provided with a depending heat retaining sleeve or skirt 12 surrounding the heating chamber and heating unit and spaced a distance therefrom. This skirt 12 is provided with an outwardly turned flange 14 at its lower end to which is secured by screws 16 a disk 18 of heat resisting insulating material, such as pyroplax that extends over the bottom wall of the heating chamber, the disk 18 and the skirt 12 forming a heat retaining casing for the heating chamber. The space between the lower end of this casing and the base 2 is closed by an annular member 20 which is secured to the underside of the disk 18 by means of the screws 16. The member 20 is provided with a vertical cylindrical wall portion 22 into which is fitted a removable cover or closure 24.

In the illustrated construction two contact strips 26 of copper, brass or other material having a high heat and electrical conductivity are provided having their outer portions set into parallel grooves 28, respectively, in the under side of the insulation disk 18 and secured therein by means of screws 30 which also serve as binding screws. One of the contact strips 26 is connected with one of the binding posts 32 of the plug socket 10 by means of a wire 34 which is held in contact with the strip by its binding post 30. The other contact strip 26 is connected with one of the terminals 36 of the heating unit, by its binding post 30. The other terminal 38 of the heating unit is connected with one end of a conducting strip or plate 40 by means of a binding screw 42, the other end of the plate 40 being fixed to the other binding post 44 of the plug socket 10. The contact strips 26 are provided with vertical portions 46 that engage the inner wall of slots 48 extending through the cover disk 18 and forming continuations of the grooves 28. The inner end portions of the contact strips 26 are bent at right angles to the vertical portions 46 and are flat against the under side of a relatively thin disk of mica 49 that is laid against the bottom wall of the heating chamber 6. The ends of the fuse are clamped against the end parts of the contact strips 26, the bottom of the chamber serving to resist the pressure of such clamping action.

The fuse, which is illustrated in Fig. 6, is a reversible fuse and comprises a flat rectangular strip or bar 50 of easily fusible material and relatively large flat terminal nickel plated pieces 52 of brass, copper or other metal of high electrical and heat conductivity, having their inner ends abutting the ends of the strip and soldered thereto by a more easily fusible solder such as pure tin. The body of the fuse may extend beyond the plane of the upper surface of the terminals 52 so as to be adjacent to or in contact with the mica 49. The fuse is applied to the device by passing it through a rectangular aperture 56 in the cover disk 18, the aperture 56 being arranged at right angles to the grooves 28 and the grooves leading into the aperture. The fuse is positioned with its terminal pieces 52 extending over the inner ends of the contact strips 26, respectively, so as to be in series with the heating unit. The terminal pieces are firmly pressed against the strips by means of a spacing block 58 which is removably inserted through the aperture 56 and is held in the aperture by means of two clamping plates 60 comprising rectangular pieces loosely mounted on screws 62 secured in apertures in the cover disk 18 and provided with thumb nuts 64 for clamping the plates 60 firmly against the under side of the ends of the space block 58. The space block 58 is provided with a central rectangular opening 66 so that the fusible portion 50 of the fuse is not engaged by the block 58 and is exposed so as to fall through the opening 66 when either the solder or the portion 50 melts.

With this construction it will be apparent that upon the wall of the heating chamber becoming overheated by the heating unit when the water in the chamber is exhausted, heat from the chamber is conducted directly through the contact strips 26 and the fuse terminals 52 to the ends of the fuse bar 50 so as to immediately fuse the bar or portions thereof and cut off the current. The close contact of the ends of the contact strips 26 with the bottom wall of the heating chamber, and the close contact of the fuse terminals 52 with the contact strips, insures positive action and prevents all electrical trouble caused by poor contacting surfaces. Another advantage of a fuse of the illustrated construction is that there is no fusible or soft metal under pressure which is a source of much trouble in many other devices, as the expansion and contraction of this soft metal draws it away from the contacting surfaces. Also, in the illustrated construction there are no springs to lose their temper by the heat.

As will be evident to those skilled in the art, my invention permits of various modifications without departing from the spirit thereof or the scope of the appended claims.

What I claim is:

1. An electrically heated utensil comprising a heating chamber, an electrical heating unit for the chamber, two electrical contact strips laid against the wall of said chamber and insulated therefrom, a fuse comprising a piece of fusible material having terminal pieces secured on its ends and extending over and in contact with said contact strips, and means for removably clamping said terminal pieces tightly against said contact strips, said fuse and contact strips being in series with said heating unit.

2. An electrically heated utensil comprising a heating chamber, an electrical heating unit therefor, and a fuse having its terminals closely adjacent to the wall of said chamber, electrically insulated therefrom and connected in series with said heating unit.

3. An electrically heated utensil comprising a heating chamber, an electrical heating unit therefor, two electrical contact strips laid against a wall of said chamber and electrically insulated therefrom, and a fuse having its terminals clamped firmly against said contact strips, said fuse and contact strips being connected in series with said heating unit.

4. An electrically heated utensil comprising a heating chamber, a thin sheet of electrical insulating material laid over a portion of the wall of said chamber, a heating unit for said chamber, two electrical contact strips laid flat against said sheet of insulating material, a fuse having terminal pieces on its ends laid flat against said contact strips, and means for firmly clamping said terminal pieces, contact strips and sheet of insulating material firmly together and against said wall, said contact strips and fuse being connected in series with said heating unit.

5. An electrically heated utensil comprising a heating chamber having a bottom wall, an electrical heating unit for said chamber, a casing enclosing the lower portion of said heating chamber having a bottom wall of insulating material, two electrical contact strips secured on said bottom wall of said casing and having flat end portions held against the bottom wall of said heating chamber and insulated therefrom, a fuse comprising a piece of fusible material and terminal pieces secured on its ends and extending over said flat end portions of said contact strips, respectively, and means for clamping said terminal pieces against said flat end portions of the contact strips comprising a block removably inserted through an aperture in the bottom wall of said casing having its ends engaging said terminal pieces and having a central aperture so as to expose said piece of fusible material, said fuse and contact strips being connected in series with said heating unit.

6. An electrically heated utensil comprising a heating chamber, a casing enclosing the lower portion of said heating chamber and having its bottom wall spaced from the bottom wall of said chamber, a heating unit for said chamber, a fuse adapted to be inserted through an aperture in said bottom wall of said casing to position its terminals against the bottom wall of said chamber, insulating material interposed between said fuse and said bottom wall, and means for clamping the fuse in position comprising a block adapted to be inserted through said aperture so as to cause its ends to engage the terminals of said fuse, and means for holding said block in position, said fuse being connected in series with said heating unit.

7. An electrically heated utensil comprising a heating chamber having a bottom wall, an electrical heating unit surrounding said chamber, a casing enclosing the lower portion of said heating chamber having its bottom wall of insulating material and extending over the bottom wall of said chamber, two electrical contact strips laid against the bottom wall of said chamber, a fuse comprising a substantially flat piece of fusible metal and flat terminal pieces secured on the ends thereof and extending over said contact strips, means comprising a member removably inserted in an aperture in said bottom wall of said casing for clamping said fuse terminal pieces against said contact strips, respectively, and a relatively thin piece of insulating material extending over the bottom wall of said chamber for electrically insulating said fuse terminal pieces and said contact strips from said bottom wall, said fuse and contact strips being connected in series with said heating unit.

8. An electrically heated utensil comprising a heating chamber having a bottom wall, an electrical heating unit for said chamber, a casing enclosing the lower portion of said heating chamber having a bottom wall of insulating material, two electrical contact strips secured on said bottom wall of said casing and having flat end portions held against the bottom wall of said heating chamber and insulated therefrom, a fuse comprising a piece of fusible material having terminals extending over said flat end portions of said contact strips, respectively, and means for clamping said terminals against said flat end portions of the contact strips comprising a block removably inserted through an aperture in the bottom wall of said casing having its ends engaging said terminals and having a central recess beneath and in line with said piece of fusible material, said fuse and contact strips being connected in series with said heating unit.

9. A fuse comprising a strip of fusible material and flat electrical contact pieces having their inner edges abutting the ends of said strip and soldered thereto by solder having a substantially higher fusing point than said strip and arranged substantially in the plane of said piece of fusible material.

10. An electrical heated utensil comprising a heated chamber, an electrical heating unit for the chamber, two electrical contact members held in proximity to the bottom wall of said chamber and insulated therefrom, a fuse comprising a strip of material having terminal pieces soldered on its ends extending over and in contact with said electrical contact members, and means for removably clamping said terminal pieces tightly against said contact members comprising a block having its ends engaging said terminals and having an aperture of at least the area of said strip and arranged directly beneath said strip.

NELSON E. MANN.